United States Patent [19]
Haberkorn et al.

[11] 3,802,292
[45] Apr. 9, 1974

[54] MOUNTING ARRANGEMENT

[75] Inventors: Gunther Haberkorn; Imko Conring, both of Werther, Germany

[73] Assignee: Weco Wehmeyer & Co., Wertter, Germany

[22] Filed: Dec. 27, 1972

[21] Appl. No.: 318,631

[30] Foreign Application Priority Data
Dec. 28, 1971 Germany............................ 7149026

[52] U.S. Cl. ............................................. 74/594.4
[51] Int. Cl. ............................................ B62m 3/08
[58] Field of Search ................................... 75/594.4

[56] References Cited
UNITED STATES PATENTS
1,782,973  11/1930  Persons............................ 74/594.4

FOREIGN PATENTS OR APPLICATIONS
419,664  11/1934  Great Britain..................... 74/594.4

Primary Examiner—Samuel Scott
Assistant Examiner—F. D. Shoemaker
Attorney, Agent, or Firm—Michael S. Striker

[57] ABSTRACT

A shaft has a fixed bearing cone provided at one end, and a discrete bearing cone surrounding the shaft at the other end. A weld secures the discrete bearing cone to the shaft in predetermined position relative to the same and to the fixed bearing cone, and a rotary component is mounted on the shaft and has respective bearings each of which surrounds and is seated on one of the bearing cones.

5 Claims, 3 Drawing Figures

MOUNTING ARRANGEMENT

BACKGROUND OF THE INVENTION

The present invention relates generally to a mounting arrangement, and more particularly to a mounting arrangement for pedals of bicycles, tricycles and the like, for wheels of roller-skates, and the like.

In addition the invention also relates to a method of assembling such a mounting arrangement.

In many instances it is necessary to mount a component so that it is turnable with reference to a shaft. This is necessary, for example, in the mounting of a pedal of a bicycle, tricycle or the like. For this purpose it is known to provide a shaft which is connected at one end with the crank of the bicycle or tricycle drive, and is provided at this end with a bearing cone formed of one piece with the shaft. At the other outer end of the shaft there is provided an additional cone in form of a discrete element which is threaded onto the outer end, for which purpose the outer end is formed with appropriate threads meshing with threads of the discrete cone. Before the discrete cone is so secured to the outer end the pedal is placed about the shaft so that one bearing of the pedal is seated on the cone fixedly formed on the shaft, whereupon the discrete cone will be threaded onto the outer end of the shaft until it also becomes seated within the other bearing of the pedal. Now a retaining washer is placed against the outer side of the bearing cone and a fixing nut is threaded onto the outer end of the shaft, pressing the retaining washer against the discrete bearing cone in order to retain the same in position.

The difficulty with this construction is that many individual components are necessary in order to permit a proper assembly thereof. Also, of course, the more components the more difficult will be the assembly operation. Even more important, however, is the fact that in order to maintain the required tolerances the retaining nut and the discrete internally screw threaded bearing cone must be threaded onto the outer end of the shaft very carefully, usually manually, at least insofar as the retaining nut is concerned, in order to obtain an appropriate mounting of the individual components without binding. Difficulties exist because the components involved usually vary quite widely in their tolerances, so that in each assembly instance, various allowances must be made to compensate for such tolerance variations. This, however, requires the services of especially qualified personnel and is therefore expensive.

The circumstances are somewhat similar in the case of wheels for rollerskates. Here the rotary component is in form of a turnable ring and, if the wheel is of synthetic plastic material, it is frequently customary to omit a separate rotary component and to appropriately configurate the wheel itself so that a surface is produced which is juxtaposed with the surface of the respective bearing cone and with bearing balls being interposed between and rolling on both of these surfaces.

Finally, it is also known in the assembly of pedals to provide the free shaft end which, in the earlier described approach is threaded, without threads and to press fit the discrete bearing cone onto this shaft end. Thereupon, that portion of the shaft end which extends outwardly beyond the bearing cone is upset in appropriate manner, deforming it to such an extent that the bearing cone is retained in position. This approach, of course, requires fewer parts but here also it is not possible to readily make allowance for tolerance variations in the various parts unless the press fitting of the discrete bearing cone is carried out manually in each and every instance. This, of course, is difficult and time consuming. If, however, the press fitting is carried out by machine as is usually the case, then the discrete bearing cone will be pushed onto the shaft to an identical extent in each and every distance, because this has been preprogrammed in the machine. Due to the tolerance variations mentioned above this will usually be unsatisfactory.

SUMMARY OF THE INVENTION

It is, accordingly, an object of the present invention to provide an improved mounting arrangement of the type here under discussion which is not possessed of the aforementioned disadvantages.

More particularly it is an object of the present invention to provide such an improved mounting arrangement which is simpler in its construction and easier to assemble than what is known from the prior art, and which permits a proper accommodation to tolerance variations of the components.

Another object of the invention is to provide a method for assembling such a mounting arrangement.

In keeping with these objects, and others which will become apparent hereafter, one feature of the invention resides in a mounting arrangement, particularly for pedals, or roller-skate wheels and the like, which briefly stated comprises a shaft, a fixed bearing cone provided on the shaft, and a discrete bearing cone placed about the shaft axially spaced from the fixed bearing cone. A weld secures the discrete bearing cone on the shaft in predetermined position relative to the same and to the fixed bearing cone, and a rotary component is mounted on the shaft and has respective bearings each of which surrounds and engages one of the bearing cones.

According to the novel method the rotary component is placed about the shaft so that one of its bearings is seated on the fixed bearing cone, whereupon the shaft is given upright orientation and the discrete bearing cone is placed over the free end of the shaft and permitted to slide along the same under the influence of gravity until it becomes seated in the other bearing of the rotary component. Then the discrete bearing cone is welded to the shaft.

The invention is based upon the realization that the discrete bearing cone, if it is permitted to slide onto the shaft under its own weight, will automatically assume on the shaft that position which corresponds to an optimum tolerance compensation irrespective of how great or how little the tolerance variations in the components may be from case to case. Once this has been obtained, the fixed connection of the discrete bearing cone with the shaft by welding assures that the thus obtained tolerance compensation will not change later on. Thus, the present invention makes possible a completely automatic assembly of all components in a very simple manner, and in a manner which assure optimum tolerance compensation which has not heretofore been possible. Moreover, the present invention requires fewer components than the prior art and permits a more rapid and less expensive assembly.

According to a currently preferred embodiment of the invention the free axial endface of the discrete bearing cone is welded to the free axial endface of the shaft. The shaft can therefore be made very short because it does not have to extend beyond the free axial endface of the discrete bearing cone, and thus material can be saved. Moreover, for such an arrangement the place where the weld is to be produced is readily accessible to a welding apparatus, and the area for effecting the weld is rather large and thus assures an appropriate and reliable welded connection.

According to a further currently preferred embodiment the welding area can be further increased in that the discrete bearing cone is provided in its free axial end-face with a center depression in which weld material may accumulate during the welding.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
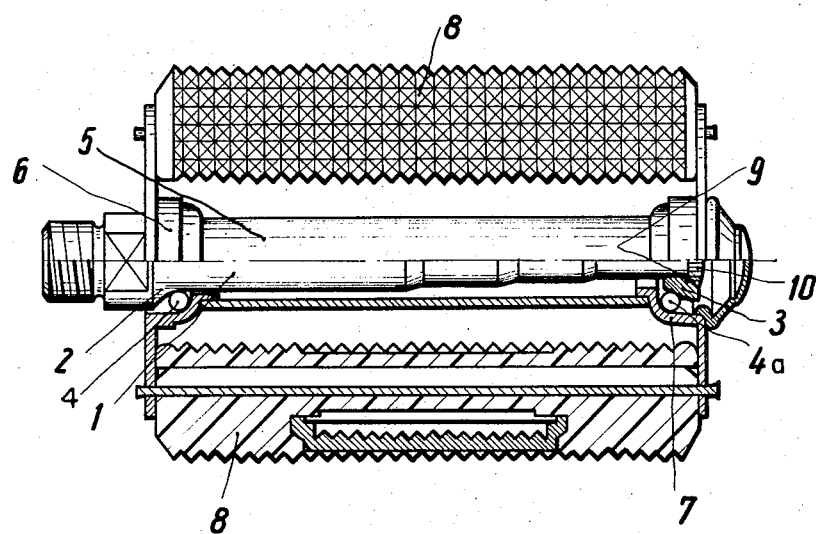
FIG. 1 is a partial axial section illustrating one embodiment of the invention.

Discussing firstly the embodiment illustrated in FIG. 1 it will be seen that reference numeral 1 identifies a shaft one end of which will be connected in known manner with the crank drive of a bicycle or tricycle. It will be appreciated that FIG. 1 shows the arrangement of a pedal for a bicycle or tricycle. At that end which is connected with the crank drive the shaft 1 has a bearing cone 2 which is formed on it, that is which is of one piece with it.

The opposite end of the shaft 1 is free and a discrete bearing cone 3 can be placed onto it. The assembly is carried out with the shaft in vertical position rather than in the horizontal position illustrated. First the inner bearing ring 4 having bearing balls as illustrated, is placed onto the bearing cone 2. Then the tube 5 having the portions 6 and 7 is placed about the shaft 1; the tube 5 carries the pedal bars 8. Now the outer bearing ring 4a is put in place and then the discrete bearing cone 3 is placed onto the free end of the shaft 1. Because the shaft 1 is in upright orientation the weight of the discrete bearing cone 3 will cause the same to slide downwardly on the shaft 1 until it assumes precisely the proper position on the shaft 1 in which it will compensate for tolerance variations in the individual components. The outer side of the bearing cone 3 is centrically provided with a depression 9. A weld is provided connecting the outer side of the bearing cone 3 with the endface of the shaft 1, and this weld is designated with reference numeral 10. Due to the depression 9 the weld forms an accumulation of material in the depression as illustrated.

Figure 2:
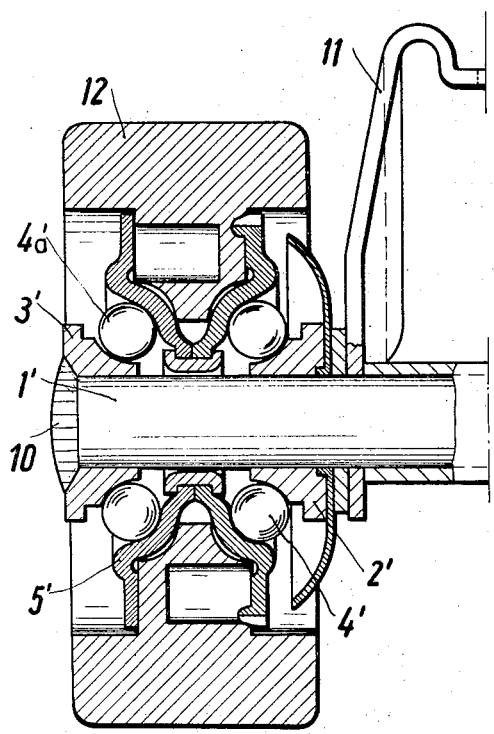
FIG. 2 is a section illustrating a further embodiment of the invention.

In FIG. 2 there is shown the assembly of a wheel for a rollerskate. Here, the shaft is identified with reference numeral 1' and carries a fixedly mounted bearing cone 2' which is secured in appropriate manner, as by press fitting, upsetting or the like, so that it will remain in place against a frame 11 of the rollerskate. Placed onto the shaft 1' which for assembly purposes is again in upright orientation, is an inner bearing ring 4' which is seated on the bearing cone 2'. Thereupon a member 5 which is connected with a wheel 12 is pushed onto the shaft 1' and now an outer bearing ring 4'a is placed onto the shaft, whereupon the discrete bearing cone 3' is placed over the free end of the shaft 1' and allowed to slide on the latter until it becomes seated in the bearing ring 4'. Now, the outer endface of the bearing cone 3' is provided with a weld 10 which connects it with the outer endface of the shaft 1', and due to the illustrated centric depression in the outer endface of the bearing cone 3' welded material again accumulates in this depression overlying the outer endface of the shaft 1'.

Figure 3:
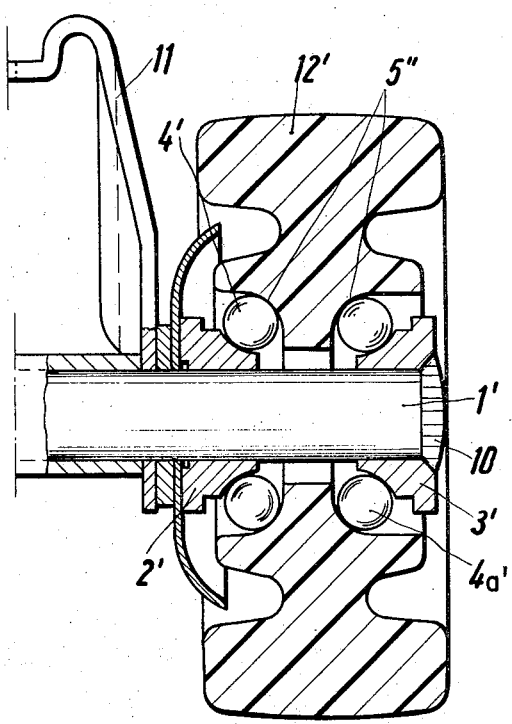
FIG. 3 is a view similar to FIG. 2 illustrating a further embodiment of the invention.

The embodiment in FIG. 3 is quite like that of FIG. 2, differing from the same only in that the wheel is identified with reference numeral 12' and is of synthetic plastic material. Because of this, the component 5' of FIG. 2 is omitted and the wheel 12' is provided in the regions juxtaposed with the bearing cones 2' and 3', respectively, with annular surface portions 5'' on which the bearing balls of the bearing rings 4' 4'a roll.

It will be understood that each of the elements described above, or two or more together, may also find a useful application in other types of constructions differing from the types described above.

While the invention has been illustrated and described as embodied in a mounting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A mounting arrangement, particularly for pedals, roller-skate wheels and the like, comprising a shaft and a fixed bearing cone provided on said shaft; a rotary component having two respective bearings mounting said rotary component on said shaft for rotation, one of said bearings surrounding and engaging said fixed bearing cone; a discrete bearing cone surrounding said shaft spaced from said fixed bearing cone in direction longitudinally of said shaft; and weld means securing said discrete bearing cone on said shaft in a mounting position which it has assumed under the influence of gravity when placed freely onto said shaft with the latter in upright position and in which position it is surrounded and engaged by the other one of said bearings, said weld means preventing said discrete bearing cone from moving relative to said shaft and to said fixed bearing cone out of said mounting position.

2. A mounting arrangement as defined in claim 1, wherein said shaft has an axial endface, said discrete bearing cone surrounding said shaft inwardly adjacent said axial endface and having an axial face facing in the same direction as said axial endface; and wherein said means connects said axial endface and said axial face.

3. A mounting arrangement as defined in claim 2, wherein said axial face is provided with a centric depression.

4. A mounting arrangement as defined in claim 1, wherein said discrete bearing cone has an axial face provided with a centric depression.

5. A method of making a mounting arrangement, particularly for pedals, roller-skate wheels and the like, comprising the steps of providing a shaft having two longitudinally spaced end portions with a fixed bearing cone at one of said end portions; inserting said shaft into a rotary component having two axially spaced ring bearings, so that a first bearing surrounds and engages said fixed bearing cone; orienting said shaft with said rotary component so that the other one of said end portions of the shaft extends upwardly; placing a discrete annular bearing cone onto said other end portion of said shaft so as to surround and descend along the same under the influence of gravity to a mounting position in which said annular bearing cone is partially received in and engaged by a second one of said bearings; and welding said discrete bearing cone to said shaft in said mounting position.

* * * * *